(12) United States Patent
Wein et al.

(10) Patent No.: US 8,724,874 B2
(45) Date of Patent: May 13, 2014

(54) FUSION OF 3D VOLUMES WITH CT RECONSTRUCTION

(75) Inventors: Wolfgang Wein, Munich (DE); Estelle Camus, Mountain View, CA (US); Matthias John, Nürnberg (DE); Ali Kamen, Princeton, NJ (US); Christophe Duong, Mountain View, CA (US); Chenyang Xu, Berkeley, CA (US)

(73) Assignees: Siemens Aktiengesellschaft, München (DE); Siemens Medical Solutions USA, Inc., Malvern, PA (US)

( * ) Notice: Subject to any disclaimer, the term of this patent is extended or adjusted under 35 U.S.C. 154(b) by 586 days.

(21) Appl. No.: 12/769,789

(22) Filed: Apr. 29, 2010

(65) Prior Publication Data

US 2010/0290685 A1 Nov. 18, 2010

Related U.S. Application Data

(60) Provisional application No. 61/177,401, filed on May 12, 2009.

(51) Int. Cl.
*G06K 9/00* (2006.01)
*G06K 9/32* (2006.01)
*G06K 9/54* (2006.01)
*G06K 9/60* (2006.01)

(52) U.S. Cl.
USPC ............................................. 382/131; 705/3

(58) Field of Classification Search
USPC ........................................................ 382/131
See application file for complete search history.

(56) References Cited

U.S. PATENT DOCUMENTS

| | | | | |
|---|---|---|---|---|
| 6,787,889 | B2 * | 9/2004 | Schoenfeld | 257/666 |
| 7,280,710 | B1 * | 10/2007 | Castro-Pareja et al. | 382/303 |
| 7,529,393 | B2 * | 5/2009 | Peszynski et al. | 382/128 |
| 2008/0095421 | A1 * | 4/2008 | Sun et al. | 382/131 |

OTHER PUBLICATIONS

Xu Miao and Rajesh P. N. Rao, Learning the Lie-Groups of Visual Invariance, 2007, Massachussets Institute of Technology, Neural Computation 19, 2666-2693 (2007), http://www.cs.washington.edu/homes/rao/liegroups-07.pdf.*

* cited by examiner

*Primary Examiner* — Hiep V Nguyen
(74) *Attorney, Agent, or Firm* — Donald B. Paschburg

(57) ABSTRACT

A method for registration of ultrasound device in three dimensions to a C-arm scan, the method including acquiring a baseline volume, acquiring images in which the ultrasound device is disposed, locating the device within the images, registering the location of the device to the baseline volume, acquiring an ultrasound volume from the ultrasound device, registering the ultrasound volume to the baseline volume, and performing fusion imaging to display a view of the ultrasound device in the baseline volume.

16 Claims, 2 Drawing Sheets

FUSION OF 3D VOLUMES WITH CT RECONSTRUCTION

CROSS-REFERENCE TO RELATED APPLICATION

This application claims the benefit of Provisional Application No. 61/177,401 filed on May 12, 2009 in the United States Patent and Trademark Office, the contents of which are herein incorporated by reference in its entirety.

BACKGROUND

1. Technical Field

The present disclosure relates to image processing, and more particularly to fusion of real-time 3D ultrasound volumes with C-arm CT reconstruction for improved visualization and navigation of catheters.

2. Discussion of Related Art

Pre- and intra-procedural cardiac imaging is an integral part of many cardiac interventions, both surgical and minimally invasive (e.g., percutaneous) ones. Regarding high-resolution static pre- and intra-operative imaging, Computed Tomography (CT), including rotational cone-beam CT (e.g., Siemens DynaCT) is widely used for diagnosis and planning. However these imaging modalities do not have real-time capabilities.

As real-time interventional modality, intra-cardiac echocardiography (ICE) is widely used in many catheterization laboratories, among others for guidance of transseptal catheterization and left atrial procedures. Siemens has recently developed an intra-cardiac ultrasound catheter, which is capable of acquiring real-time ultrasound volumes from within the heart. This novel imaging modality will by itself have an immense impact on intra-cardiac procedures. However, adequate training and experience are required in order to fully benefit from using ICE in routine EP procedures. A less trained or more occasional user will more likely have difficulties in finding the orientation of the ICE catheter within the body and recognize the anatomical structures, especially when the catheter moves quickly. Furthermore, for certain procedures, such as electrophysiological (EP) ablation for atrial fibrillation, fusion of such real-time 3D ICE data with pre-operative or intra-operative high resolution CT or MRI (Magnetic Resonance Imaging) imaging can provide better navigation and therefore reduce procedure time as well as improve the treatment outcome.

In addition, one typical complication of RF ablation for atrial fibrillation is associated with the esophagus (e.g., stenosis due to RF burning of the tissue in the esophageal wall). While it may not be easy to image the esophagus precisely with the ICE technology, it is well represented on the high-resolution CT or MRI data.

Complementing local real-time 3D acquisitions from the ICE catheter with the global and high-resolution map of the anatomy provided by the pre-operative or intra-operative imaging modality (CT or MRI) is yet another step to improve the usability of the ICE in targeting and navigation problems the physicians usually face during cardiac procedures.

BRIEF SUMMARY

According to an embodiment of the present disclosure, a method for registration of ultrasound device in three dimensions to a C-aim scan includes acquiring a baseline Dyna CT volume, acquiring three dimensional Dyna-CT or at least two x-ray images in which the ultrasound device is disposed, locating the device within the images, registering the location of the device to the baseline Dyna CT volume, acquiring an ultrasound volume from the ultrasound device, registering the ultrasound volume to the baseline volume, and performing fusion imaging to display a view of the ultrasound device in the baseline volume.

According to an embodiment of the present disclosure, a non-transitory computer readable medium stores instructions executable by a processor to performed a method for registration of ultrasound device in three dimensions to a C-arm scan, the method including acquiring a baseline volume, acquiring images in which the ultrasound device is disposed, locating the device within the images, registering the location of the device to the baseline volume, acquiring an ultrasound volume from the ultrasound device, registering the ultrasound volume to the baseline volume, and performing fusion imaging to display a view of the ultrasound device in the baseline volume.

According to an embodiment of the present disclosure, a system for registration of ultrasound device in three dimensions to a C-arm scan includes a memory device storing a plurality of instructions embodying the system, and a processor for receiving input data corresponding to a baseline volume and executing the plurality of instructions to perform a method including acquiring images in which the ultrasound device is disposed, locating the device within the images, registering the location of the device to the baseline volume, acquiring an ultrasound volume from the ultrasound device, registering the ultrasound volume to the baseline volume, and performing fusion imaging to display a view of the ultrasound device in the baseline volume.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, a method for improving the navigation and guidance of devices and catheters in EP and interventional cardiology procedures using volumetric data fusion. The clinical workflow of the interventional procedure includes the acquisition and reconstruction of CT datasets from a C-arm x-ray angiographic system and the real-time acquisition of volumetric ultrasound datasets with an intra-cardiac ultrasound catheter. Mono and multi-modal volumetric registration methods that are suitable for real-time or quasi real-time volumetric fusion are described. Furthermore novel volumetric visualization modes which include both 2D and 3D data are presented.

In the following, a clinical workflow is described that accommodates 3D real-time or quasi real-time fusion of both imaging modalities (ultrasound and CT or MRI) as well as novel methods for registration and fused visualization of the pre- and intra-procedural imaging data.

Clinical Workflow for 3D Fusion.

Figure 1:
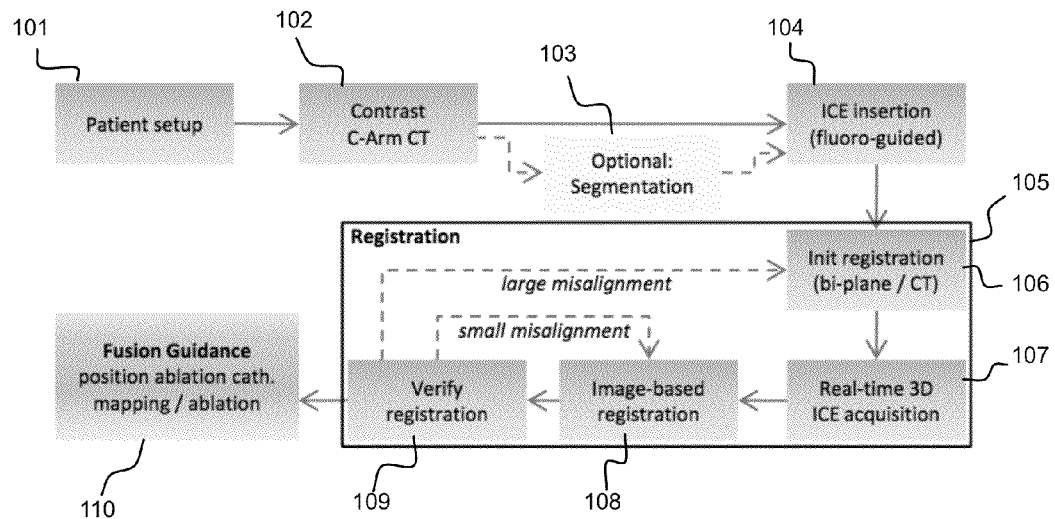
FIG. 1 is a flow diagram of a method for registering and tracking 3D ultrasound in C-arm CT, according to an exemplary embodiment of the present disclosure.

In FIG. 1, a workflow is shown that can be used for an ablation procedure, guidance of transseptal punctures, guidance of intracorporeal devices during cardiac interventions, etc.

At blocks 101 and 102, a baseline cardiac C-arm CT reconstruction of a patient with contrast agent injection is performed. Optionally, automatic or semi-automatic segmentation of the heart chambers (in particular of the left atrium) and the esophagus may be performed (see block 103). At block 104, an ICE catheter is inserted into the patient and guided to the heart (typically to the right side via the femoral or jugular vein), if needed, under fluoroscopic guidance. The ICE-CT registration 105 is initialized by locating the ICE catheter tip either in a bi-plane fluoro view, or in a low-dose C-arm CT reconstruction 106. This data is in turn automatically registered to the baseline volume. At block 107, an ICE acquisition is performed, typically by rotating the ICE catheter such that it covers the whole left atrium. This recording is automatically registered at block 108 to the baseline CT, using the algorithms described herein. After visual assessment at block 109, this process can be repeated depending on the quality of the alignment. Thereafter, the actual EP procedure, which includes electromapping and ablation, can be executed under fusion imaging at block 110. The position of the ICE information within the C-arm CT volume can be updated any time by image-based tracking and/or additional fluoroscopic acquisitions.

Figure 2:
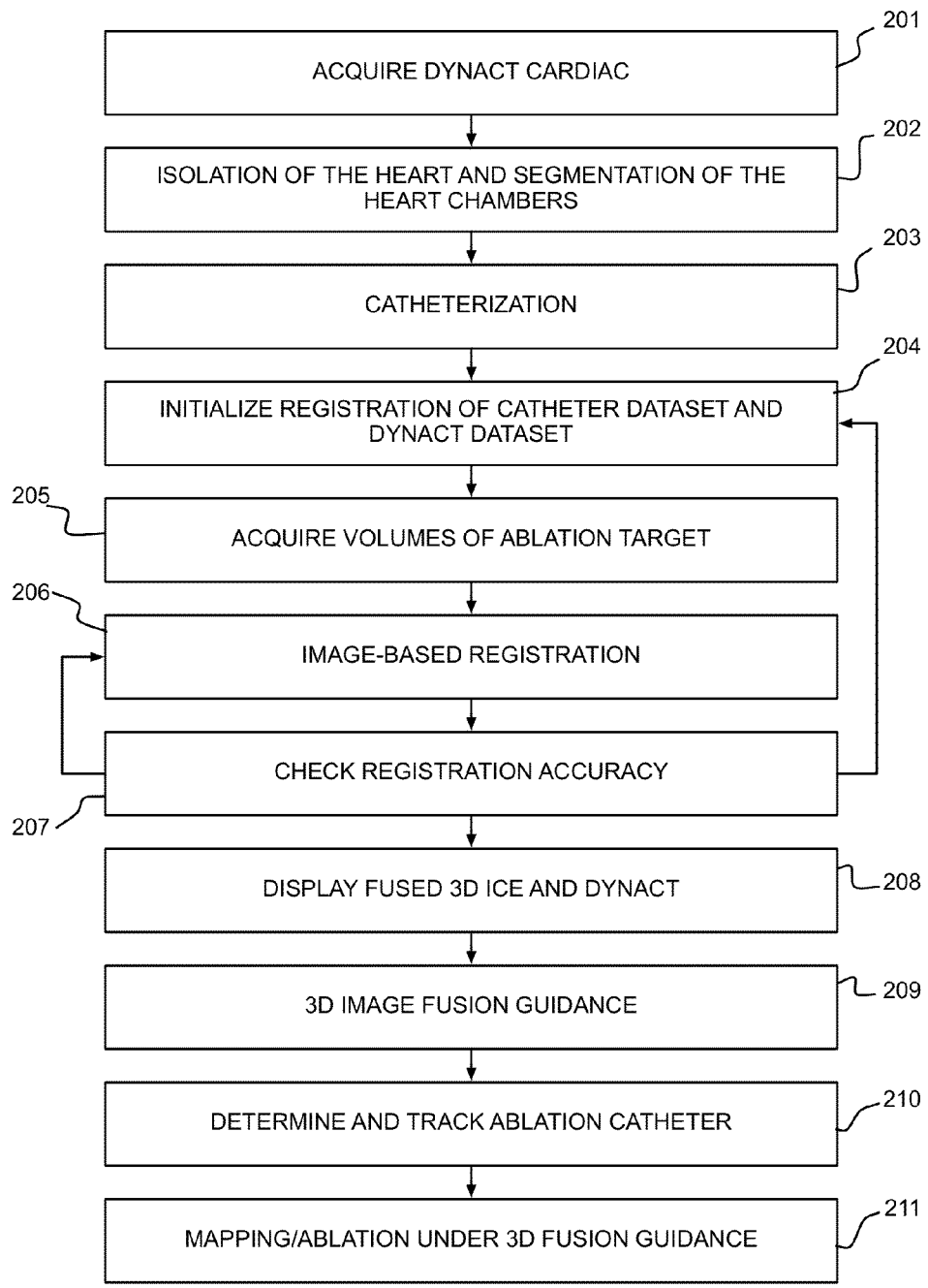
FIG. 2 is a flow chart of an ablation procedure according to an embodiment of the present disclosure.

Referring to FIG. 2, a workflow is described for the case of an ablation procedure to treat atrial fibrillation. As with FIG. 1, the workflow of FIG. 2 can also be used in the case of e.g., guidance of transseptal punctures or guidance of other devices for cardiac interventions.

At block 201, a DynaCT Cardiac dataset is acquired. This dataset may be a baseline datasets with contrast agent injection. At block 202 automatic or semi-automatic isolation of the heart and segmentation of the heart chambers (e.g., the left atrium) and the esophagus are performed on the DynaCT Cardiac dataset. At block 203, the 3D ICE catheter is inserted into the body and guided to the heart (e.g., the right side). Here, fluoroscopic guidance my be used. At block 204, the registration between the 3D ICE catheter datasets and the DynaCT dataset is initialized. At block 205, the 3D ICE catheter is positioned to a desired location and volumes of an ablation target are acquired. An image-based registration is performed at block 206. At block 207 the registration accuracy is checked. If slight misalignment is detected, the method returns to block 206, while if significant misalignment is detected, the method returns to block 204. According to an embodiment of the present disclosure, a significant misalignment is a displacement of greater than about 5-10 mm between an anatomical structure in two images. One of ordinary skill in the art would recognize that different displacements may be used as a threshold for misalignment and that the present disclosure is not limited to embodiments described. At block 208, a fused image of the 3D ICE and DynaCT datasets is displayed. At block 209, the ablation catheter may be positioned under 3D image fusion guidance. At block 210, the position of the ablation catheter on the 3D ICE catheter is determined and tracked. At block 211, mapping/ablation under 3D image fusion guidance may be performed.

Note that while DynaCT cardiac datasets are discussed in the exemplary method, other datasets may be used, such as a pre-operative cardiac CT or MRI dataset. In the case of pre-operative cardiac CT or MRI datasets no update of the datasets can be obtained during the ablation procedure.

Referring more specifically to block 201, and the cardiac (Dyna-) CT dataset; a pre-operative X-Ray based volumetric acquisition (CT/DynaCT) is obtained of the heart, generally after contrast injection, and gated for the end-diastole heart phase. It is henceforth used as a reference (baseline) dataset for clinical planning and assessment of the cardiac anatomy, as well as registration with live intra-operative imaging data.

At block 202, the segmentation of the heart, heart chambers and esophagus is performed. This removes the anatomic structures present on the CT datasets that are outside of the region of interest for the cardiac ablation (ribs, lungs, etc.) and not relevant for the procedure.

The segmentation of the heart chambers (in particular of the left atrium) provides detailed information on the 3D anatomy of the region of interest. The segmented heart chambers are used in the remainder of the disclosure as an example of a method for anatomic reference and guidance.

The segmentation of the esophagus is useful when it comes to ablating the cardiac tissue around the pulmonary vein at a location close to the esophageal tissue. Ablation procedures for atrial fibrillation are associated with complications like damage or burning of the esophageal tissue (which leads to for example, esophageal fistula), therefore it is important to continuously display the exact location of the esophagus during the ablation part of the procedure, and in particular together with the real-time visualization of ultrasound data.

After the patient has been set up in the cathlab, the real-time 3D ICE catheter is inserted at block 203, typically through venous access from the groin, and navigated into the heart (e.g. the right atrium). In a typical procedure, an ablation catheter has to be inserted into the left atrium and precisely navigated to a target site corresponding to an electrophysiological defect. In this case, the real-time 3D ICE catheter will be used to image the left atrium, visualize the ablation catheter alongside cardiac wall structures, as well as to fuse with the DynaCT data in order to provide accurate navigation.

At block 204, in order to perform fusion of different imaging modalities, the two imaging modalities are registered together, in space and time. The registration determines a rough estimation of the position of the two volumetric datasets (ultrasound and CT) relative to each other. Determining the position of the tip of the ICE catheter is a sufficient condition to achieve this.

For spatial registration of 3D ICE different methods may be used, either alternatively or in combination (to increase accuracy/robustness):

Position sensor spatial registration: A position sensor is attached to the 3D ICE catheter and used to track the position of the tip of the 3D ICE catheter in real-time Interactive spatial registration: One, or a number of, end-diastole ICE volumes are visualized together with the baseline DynaCT as suggested in step 8. A physician or technician then manipulates their spatial arrangement (e.g. with the mouse) until good visual overlay of corresponding anatomic structures is achieved. This method may comprise acquiring a single ICE volume of a particular cardiac view that is easy to match with the baseline data.

Fluoroscopic spatial registration: Fluoroscopic images of the 3D ICE catheter can be acquired from two or more different angles, the position of the 3D ICE catheter is then detected (automatically or semi-automatically) on these images and its position is calculated based on the geometrical configuration of the C-arm system and position detected on the image.

DynaCT spatial registration: Once the 3D ICE catheter has been brought to the region of interest, a low dose DynaCT acquisition is performed. The position of the tip of the 3D ICE catheter is detected automatically or semi-automatically in this DynaCT dataset. It is registered to the contrasted baseline acquisition (using established image-based volumetric registration and/or geometric configuration of the C-arm and patient table), in order to compensate for patient shift and/or respiratory motion and/or patient table motion. This links the data sets together such that the spatial position and orientation of the ICE catheter within the baseline data is known.

Catheter sweep spatial registration: The 3D ICE catheter is moved slowly around the area of interest while data is continuously recorded. Using image-based registration (or a position sensor method) the 3D data is reconstructed such that a large 3D volume is built. This 3D volume is then registered with an image-based method to the DynaCT data information (see step 6 below).

TTE spatial registration: A volumetric transthoracic echocardiography (TTE) acquisition of the heart is performed. The position of the tip of the 3D ICE catheter is determined in this volumetric dataset (automatically or semi-automatically). Simultaneously (or sequentially) the TTE volume dataset is registered with the baseline DynaCT dataset. From this registration the position of the tip of the 3D ICE catheter in the baseline DynaCT dataset can be determined.

Referring to block 205; if the baseline data is only available in one cardiac phase (e.g., end-diastole), as described above, only volumes of the live 3D ICE data corresponding to that phase should be considered for registration. ECG gating is a common solution; however the ECG signal might be delayed with respect to actual cardiac motion, or, in the worst case, not directly be related at all, considering patients with heart arrhythmia. An image-based technique for detecting periodic motion can be used for this purpose. End-diastole frames are tagged and henceforth used for image-based registration to the baseline data.

At block 206, an image-based registration is performed. Automatic image-based registration of a 3D cardiac ICE volume with a baseline CT resamples a certain representation of the reference data at the presumed location of the moving (ICE) data, and determines the quality of alignment using an image similarity metric. An iterative optimization strategy changes the spatial position and orientation of the ICE frame until convergence at the best alignment. In an exemplary embodiment, the gradient magnitude volume of CT is determined, after restricting its intensities to a significant range depicting cardiac structures. This is the representation of the fixed volume, which is re-sampled to determine the normalized cross-correlation (NCC) similarity metric with the ICE frame. A Simplex-based optimization strategy then refines the ICE volume location.

Beyond using a static gradient magnitude volume as comparison for ultrasound, a simulation of ultrasonic effects from CT is used to better incorporate orientation-dependent artifacts like (specular) reflection and occlusion. It is combined with a designated multi-channel similarity metric, which is invariant to missing simulation details.

More particularly, the registration of a single end-diastole ICE volume U to the baseline volume R can be described as $$\underset{\phi}{\mathrm{argmax}}\, CC(U, R \cdot T^{-1}(\phi)) \quad (1)$$

where T is the rigid homogeneous transformation matrix mapping U on R, parameterized by a 6-vector $\phi$. CC is the Pearson's correlation coefficient, which is used because it is independent of scale and bias between the simulated reflection and actual ultrasound intensities. $R \circ T^{-1}$ denotes a resampling of R with the transformation $T^{-1}$. The scan lines of the ICE data are scan converted into a Cartesian grid, which both serves as a low-pass filter and makes the resolution more isotropic.

The initialization (see block 204) is provided by manually extracting the position of the ICE catheter from a bi-plane fluoroscopic acquisition, or a low-dose C-arm CT reconstruction. The optimization then includes a global search on the rotation around the catheter axis, followed by a Simplex direct search method. That is, using the information obtained from the initialization of the registration between the 3D ICE catheter datasets and the DynaCT datasets at block 204, the registration algorithm is modified to reduce the number of parameters to one translation along and the rotation about the catheter axis. Using this concept, the search space dimensions are reduced to two as opposed to six, ensuring robustness.

In a structured based registration scenario, an anatomical structure is segmented out (e.g., automatically or semi-automatically) from a 3D ICE volume. The segmented structure is then registered to the corresponding segmentation from the 3D baseline data set done prior to the actual procedure. The registration procedure can be done similarly to that reported by Levoy, *Efficient Variants of the ICP Algorithm*, Third International Conference on 3D Digital Imaging and Modeling #DIM, 2001.

Alternatively, only a segmentation of the baseline data is used. In this case, regions with high echogeneity in the ICE data suggest cardiac structures, and can directly be registered to the segmentation. A 3D distance transform of the baseline segmentation can improve accuracy and robustness.

Referring to hybrid mono- and multi-modal registrations of ICE sequences, a single ICE volume only provides a narrow volumetric field of view within the cardiac anatomy, resulting in ambiguous locations suggesting good alignment. Therefore manual initialization close to the correct solution would be needed for an automatic registration to converge.

Because the ICE catheter is maneuvered within the heart to image different regions of interest, successive end-diastole ICE volumes can be used to create an extended-field-of view image. Those successive volumes need to be "stitched" together, wherein they have to be brought into correct alignment themselves. Mono- and multi-modal similarity metrics are simultaneously optimized for that purpose, respectively. The first can be standard pair-wise similarity measures, such as Sum of Squared Differences (SSD), Sum of Absolute Differences (SAD), Normalized Cross-Correlation (NCC), local NCC, or ultrasound-specific similarity measures averaged over successive end-diastole frame pairs. The latter is a multi-modal similarity measure in conjunction with simulation from CT, as suggested herein. The non-linear optimization now refines multiple pose parameters of a number of successive ICE frames, until both their internal alignment, as well as the alignment to the baseline CT, are optimal.

As an exemplary embodiment of a trajectory registration, the pose parameters of a sequence of successive ICE frames are refined, until both the alignment to the baseline C-arm CT, as well as their internal alignment are optimal:

$$\underset{\phi}{\mathrm{argmax}}\, \frac{1}{N}\sum_{i=1}^{N} CC(U_i, R \cdot T_i^{-1}) - \frac{\alpha}{N-1}\sum_{i=1}^{N-1} SAD(U_i, U_{i+1} \cdot (T_i^{-1} T_{i+1})) \quad (2)$$

As before, the correlation coefficient serves as multimodal measure. Sum of Absolute Differences $$(SAD)(U, V) = \frac{1}{|\Omega|} \sum |u_i - v_i|$$

works for measuring the alignment of successive ICE volumes, where the flexibility of CC is not needed.

Since SAD is a dissimilarity measure, it is negated and weighted with a parameter α. Rather than optimizing the unconstrained problem with N□6 degrees of freedom (DOF), only the first and last transformation are manipulated, assuming all volumes are located on a linear trajectory:

$$\phi = \begin{pmatrix} \phi_0 \\ \phi_1 \end{pmatrix}; \; T_i = T(\phi_0)\exp\left(\frac{i-1}{N-1}\log(T(\phi_0)^{-1}T(\phi_1))\right) \quad (3)$$

Here, Lie manifold based interpolation of transformation matrices is used; the optimization problem is reduced to 12 DOF. Note that the individual SAD values do not have to be weighted with respect to volume overlap because by using this manifold interpolation all successive volumes will have equal overlap.

For arbitrarily long ICE sequences, or continuous motion tracking, the registration described by equation 3, is repeatedly applied to an overlapping subset of all volumes.

Pair-wise similarity metrics have the drawback that normalization with the amount of overlapping image content is required. Therefore, their value changes not only due to the quality of alignment, but also due to the spatial configuration itself, as each pose change alters the overlapping region of interest (ROI) used to compute the measure.

If generally more than two ICE volumes are overlapping at the same time, an alternative, more robust approach is applicable. A multi-variate similarity measure, as suggested by Wachinger et al., *Three-Dimensional Ultrasound Mosaicing*, MICCAI October 2007, Brisbane, Australia, can be computed on a ROI that includes all considered volumes. For every voxel in the ROI, as many ultrasound image intensities as are present, are used for accumulating the overall similarity.

Using a number of n successive end-diastole ICE volumes as described for hybrid mono- and multi-modal registrations of ICE sequences would result in optimizing n rigid transformations and yield 6*n degrees of freedom (DOF). However, in reality the motion of the ICE catheter can be assumed not to be completely arbitrary. For example, often the physician translates or twists the catheter over a number of cardiac cycles. We therefore only optimize the pose parameters of the first and last frame of a series of m end-diastole ICE volumes, reducing the complexity of the optimization problem to 12 DOF. The intermittent volume transformations are computed using Lie-group based interpolation of homogenous transformation matrices.

More advanced motion models can be used, such as interpolating a motion trajectory with adaptive placement of "key frames" based on internal similarity or phase information (both described herein).

After a registration of a dynamic ICE recording is computed from the end-diastole volumes, the same (Lie-group based) transformation interpolation is used to extrapolate the pose of all ICE volumes.

For hardware acceleration and concurrency, executing the aforementioned algorithms requires a significant amount of computational power for resampling and comparing data, typically involving tri-linear interpolation on volumes. An enormous performance boost can be obtained by leveraging the 3D texturing capabilities, as well as hardware parallelism of current graphics processing units (GPU). In an exemplary embodiment, all ICE volumes are loaded as 3D textures on a GPU. Resampling and comparison are executed, implicitly parallel, on the programmable fragment shader units. Besides, the required scan-conversion from ultrasonic scanline data to Cartesian coordinates can be integrated with a 3D lookup texture; yielding further speedup and avoiding loss of information due to an extra resampling step.

GPU acceleration is just one option for an efficient implementation of the proposed techniques. In the future, all computing environments will be massively parallel. The described algorithms provide a number of anchor points for concurrent implementation, at different levels of granularity. For example, registration can be parallelized by simultaneously evaluating different pose configurations (large granularity), or just evaluating a grid of voxels at the same time, similar to the GPU solution (small granularity).

The methods described herein can be used to automatically register a static or moving 4D ICE acquisition to pre-operative CT data. Furthermore, they lay the foundation for real-time tracking of 4D ICE within cardiac CT data. Here, the ICE volumes are obtained in real-time, e.g. through a shared-memory streaming API on the ultrasound workstation. The method extracts end-diastole volumes. An update of the motion of the last view end-diastole frames is computed with one change. It is applicable to assume the oldest frame having correct alignment, only optimizing the pose of the last frame, with all intermittent ones being interpolated.

Another option that can improve real-time tracking robustness, is to compound an extended-field-of-view (EFOV) ICE volume from a designated rotation through the left atrium by the physician. In addition to the described methodology, the incoming ICE volumes can be compared against this EFOV volume, potentially making the image-based tracking insensitive to abrupt catheter motion.

At block 208, once images from each modality are successfully registered, they can be fused and displayed together. The CT data provide a bigger picture of the scene, however the data is static. The ICE volumetric information is updated in real-time, however the field of view is much smaller. By fusing both modalities together, a region of interest can be monitored in real-time while keeping a still picture of the surroundings to improve the understanding of the content and orientation of the ICE volume. Several display options are possible.

In this view, standard 2D planes usually used by radiologists and a 3D volume rendering view are displayed together.

Automatic, semi-automatic or manual segmentation of the CT datasets can be performed and used to further enhance the fused visualization. Additional DynaCT volumes (with or without contrast agent injection) can be acquired during the procedure and used to update the initial (baseline) volume. For example, low dose DynaCT can also be acquired and fused to add an approximate position of the different catheters to the visualization. The whole heart isolated from the rest of the body or chambers, arteries, veins, even catheters or other devices can be extracted and highlighted. Such structures can then be more easily tracked in the ICE images and help the navigation of the catheter as well.

As 3D ICE volumes are acquired in real-time, registration on successive end-diastole volumes, as suggested in block 206, can be used to create extended field of view (EFOV) data of gross cardiac anatomy. An appropriate 3D visualization of such data is multi-volume rendering, for example, as described by Plate et al., *A Flexible Multi-Volume Shader Framework for Arbitrarily Intersecting Multi-Resolution Datasets*, IEEE Transaction on Visualization and Computer Graphics, vol. 13, no. 6, November 2007. It renders an arbitrary number of volumes with any orientation and overlap, with correct blending and occlusion handling. The following image shows such a visualization of five ICE volumes, where the ICE catheter has been rotated in a clay left atrium phantom.

In Burns et al., *Feature Emphasis and Contextual Cutaways for Multimodal Medial Visualization*, EuroVis 2007 conference, Norrköping, Sweden, May 2007, described technology that allows showing live ultrasound embedded within a larger CT data set. This can be used to visualize intraoperative ICE within the baseline DynaCT as well. It uses so-called "importance driven rendering" to maintain a clear view onto the live ICE volume with only important cardiac structures blended before it (using e.g. semi-transparent overlay), and more opaque representation of surrounding anatomy. It does not require any segmentation of structures, but rather uses 2D transfer functions on both CT intensity and gradient to emphasize on cardiac structures. The following picture depicts a corresponding visualization for abdominal CT and ultrasound data.

At block 210, the determination and tracking of the position of the ablation catheter on the 3D ICE catheter is performed. The position of the tip of the ablation catheter is used for ablation procedures. Knowing the position of the tip of the ablation catheter enables to correlate with the optimal anatomical and electrical position of the tissue to be ablated, to store this information together with the anatomical information and electrical activity of the cardiac tissue and finally to measure the distance between the tip of the ablation catheter and the esophagus. This distance can be measured by using the anatomical information from the DynaCT datasets (e.g. from the segmented esophagus) and by computing the shortest distance between the position of the ablation catheter and the esophageal tissue. This parameter may be displayed on the display screen (with fused rendering) and updated in quasi real-time after each determination of the new position of the ablation catheter.

It is to be understood that embodiments of the present disclosure may be implemented in various forms of hardware, software, firmware, special purpose processors, or a combination thereof. In one embodiment, a method for low complexity signal analysis may be implemented in software as an application program tangibly embodied on a computer readable medium. The application program may be uploaded to, and executed by, a processor comprising any suitable architecture.

Figure 3:
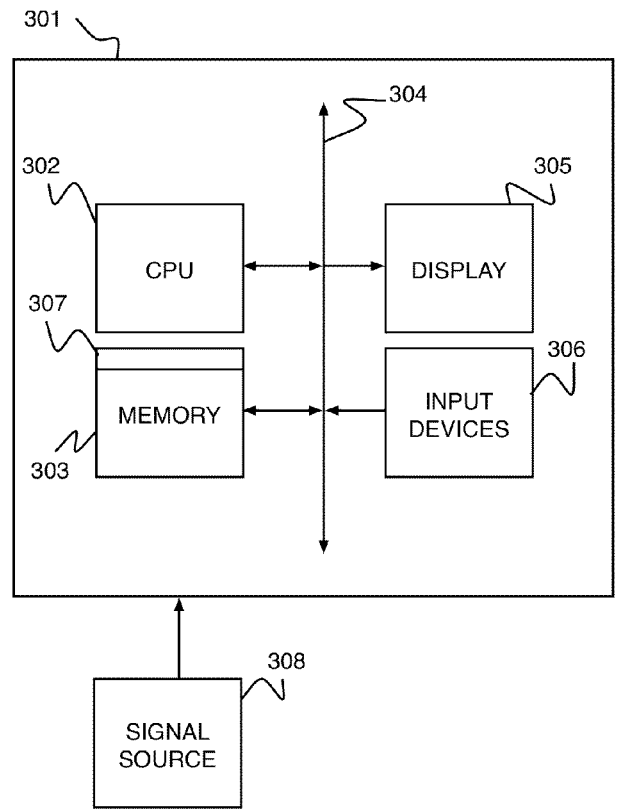
FIG. 3 is a diagram of a computer system according to an embodiment of the present disclosure.

Referring to FIG. 3, according to an embodiment of the present disclosure, a computer system 301 for implementing a method for fusion of real-time 3D ultrasound volumes with C-arm CT reconstruction can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 is non-transitory and can include random access memory (RAM), read only memory (ROM), disk drive, tape drive, etc., or a combination thereof. Embodiments of the present disclosure can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present disclosure.

The computer platform 301 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the methods described herein are programmed. Given the teachings of the present disclosure provided herein, one of ordinary skill in the related art will be able to contemplate these and similar implementations or configurations of embodiments described herein.

Having described embodiments for fusion of real-time 3D ultrasound volumes with C-arm CT reconstruction, it is noted that modifications and variations can be made by persons skilled in the art in light of the above teachings. It is therefore to be understood that changes may be made in embodiments of the present disclosure that are within the scope and spirit thereof.

What is claimed is:

1. A method for registration of ultrasound device in three dimensions to a C-arm scan comprising:
   acquiring a baseline volume from a C-arm computed-tomography apparatus;
   inserting and navigating an ultrasound device to an organ in a patient's body;
   performing an initial registration of an ultrasound image acquired by said ultrasound device to said baseline volume;
   acquiring a plurality of images in which the ultrasound device is captured;
   performing a multimodal registration of the ultrasound volume to the baseline volume, by an iterative search that includes resampling data of the baseline volume in a neighborhood of the ultrasound device and optimizing an alignment of the baseline volume to an ultrasound volume using an image similarity metric, wherein said image similarity metric is $$\operatorname*{argmax}_{\phi} \frac{1}{N} \sum_{i=1}^{N} CC(U_i, R \cdot T_i^{-1}),$$

wherein CC is a Pearson's correlation coefficient, N is the number of ultrasounds volumes U, T is a transformation matrix mapping the ultrasound volume U on the baseline volume R, and $\phi$ is a 6-vector that parameterizes T, and said optimization includes a search on a rotation about an axis of the ultrasound device followed by a Simplex direct search; and
   performing fusion of said registered ultrasound volume and baseline volume to display a view of the ultrasound device in the baseline volume, wherein the steps of performing an initial registration, performing a multimodal registration, and performing fusion are executed by a computer processor.

2. The method of claim 1, wherein performing an initial registration of an ultrasound image to said baseline volume comprises determining a tip of said ultrasound device in said ultrasound image and said baseline volume.

3. The method of claim 1, further comprising registering an ultrasound image sequence to said baseline image by performing a mono-modal registration on successive end-diastole ultrasound images using a pair-wise similarity measure, and performing said multimodal registration between each successive end-diastole ultrasound image and said baseline image, wherein fused ultrasound and baseline images are used to guide said ultrasound device to a target location.

4. The method of claim 3, wherein said mono-modal registration comprises computing $$-\frac{\alpha}{N-1}\sum_{i=1}^{N} SAD(U_i, U_{i+1} \cdot (T_i^{-1} T_{i+1})),$$

wherein N is the number of ultrasounds volumes U, T is a transformation matrix, SAD is a Sum of Absolute Differences, α is a weighting parameter, and performing said multimodal registration comprises computing $$\operatorname*{argmax}_{\phi} \frac{1}{N} \sum_{i=1}^{N} CC(U_i, R \cdot T_i^{-1}),$$

wherein N is the number of ultrasounds volumes U, T is a transformation matrix mapping the ultrasound volume U on the baseline volume R, φ is a 6-vector that parameterizes T, and CC is a Pearson's correlation coefficient.

5. The method of claim 4, wherein, if the ultrasound images are on a linear trajectory, $$T_i = T(\phi_0)\exp\left(\frac{i-1}{N-1}\log(T(\phi_0)^{-1} T(\phi_1))\right),$$

wherein $\phi_0$ and $\phi_1$ are endpoint ultrasound parameter 6-vectors, and T is the transformation.

6. The method of claim 4, further comprising using a Lie manifold based interpolation of the transformation matrices T, wherein the optimization is reduced from 6N degrees of freedom to 12 degrees of freedom.

7. A non-transitory computer readable medium storing instructions executable by a processor to performed a method for registration of ultrasound device in three dimensions to a C-arm scan, the method comprising:
 acquiring a baseline volume from a C-arm computed-tomography apparatus;
 inserting and navigating an ultrasound device to an organ in a patient's body;
 performing an initial registration of an ultrasound image acquired by said ultrasound device to said baseline volume;
 acquiring images in which the ultrasound device is disposed;
 performing a multimodal registration of the ultrasound volume to the baseline volume, by an iterative search that includes resampling data of the baseline volume in a neighborhood of the ultrasound device and optimizing an alignment of the baseline volume to an ultrasound volume using an image similarity metric, wherein said image similarity metric is $$\operatorname*{argmax}_{\phi} \frac{1}{N} \sum_{i=1}^{N} CC(U_i, R \cdot T_i^{-1})$$

wherein CC is a Pearson's correlation coefficient, N is the number of ultrasounds volumes U, T is a transformation matrix mapping the ultrasound volume U on the baseline volume R, and φ is a 6-vector that parameterizes T, and said optimization includes a search on a rotation about an axis of the ultrasound device followed by a Simplex direct search; and
 performing fusion of said registered ultrasound and baseline image to display a view of the ultrasound device in the baseline volume,
 wherein the steps of performing an initial registration, performing a multimodal registration, and performing fusion are executed by a computer processor.

8. The non-transitory computer readable medium of claim 7, wherein the registration of the ultrasound volume to the baseline volume uses the image gradients from the baseline volume.

9. A system for registration of ultrasound device in three dimensions to a C-arm scan comprising:
 an ultrasound device adapted to being guided in and acquiring ultrasound images from with a patient's body;
 a memory device storing a plurality of instructions embodying the system;
 a computer processor for receiving input data corresponding to a baseline volume acquired from a C-arm computed-tomography apparatus and executing the plurality of instructions to perform a method comprising:
 performing an initial registration of an ultrasound image acquired by said ultrasound device to said baseline volume;
 acquiring images from the ultrasound device disposed in a patient's body;
 performing a multimodal registration of the ultrasound volume to the baseline volume, by segmenting an anatomical structure from the ultrasound volume and registering said anatomical structure to a corresponding anatomical structure segmented from said baseline image, wherein a 3D distance transformation of the baseline segmentation is used; and
 performing fusion imaging to display a view of the ultrasound device in the baseline volume.

10. The method of claim 9, wherein the registration of the ultrasound volume to the baseline volume uses the image gradients from the baseline volume.

11. The non-transitory computer readable medium of claim 9, wherein performing an initial registration of an ultrasound image to said baseline volume comprises determining a tip of said ultrasound device in said ultrasound image and said baseline volume.

12. The non-transitory computer readable medium of claim 9, the method further comprising registering an ultrasound image sequence to said baseline image by performing a mono-modal registration on successive end-diastole ultrasound images using a pair-wise similarity measure, and performing said multimodal registration between each successive end-diastole ultrasound image and said baseline image, wherein fused ultrasound and baseline images are used to guide said ultrasound device to a target location.

13. The non-transitory computer readable medium of claim 12, wherein said mono-modal registration comprises computing $$-\frac{\alpha}{N-1}\sum_{i=1}^{N} SAD(U_i, U_{i+1} \cdot (T_i^{-1} T_{i+1})),$$

wherein N is the number of ultrasounds volumes U, T is a transformation matrix, SAD is a Sum of Absolute Differences, a is a weighting parameter, and performing said multimodal registration comprises computing $$\operatorname*{argmax}_{\phi} \frac{1}{N}\sum_{i=1}^{N} CC(U_i, R \cdot T_i^{-1}),$$

wherein N is the number of ultrasounds volumes U, T is a transformation matrix mapping the ultrasound volume U on the baseline volume R, $\phi$ is a 6-vector that parameterizes T, and CC is a Pearson's correlation coefficient.

14. The non-transitory computer readable medium of claim 13, wherein, if the ultrasound images are on a linear trajectory, $$T_i = T(\phi_0)\exp\left(\frac{i-1}{N-1}\log(T(\phi_0)^{-1}T(\phi_1))\right),$$

wherein $\phi_0$ and $\phi_1$ are endpoint ultrasound parameter 6-vectors, and T is the transformation.

15. The non-transitory computer readable medium of claim 13, the method further comprising using a Lie manifold based interpolation of the transformation matrices T, wherein the optimization is reduced from 6N degrees of freedom to 12 degrees of freedom.

16. The non-transitory computer readable medium of claim 9, wherein said image similarity metric is $$\operatorname*{argmax}_{\phi} \frac{1}{N}\sum_{i=1}^{N} CC(U_i, R \cdot T_i^{-1})$$

where N is the number of ultrasounds volumes U, T is a transformation matrix mapping the ultrasound volume U on the baseline volume R, $\phi$ is a 6-vector that parameterizes T, and CC is a Pearson's correlation coefficient.

* * * * *